(12) United States Patent
Ibrahim et al.

(10) Patent No.: US 11,689,118 B2
(45) Date of Patent: Jun. 27, 2023

(54) CONVERTER WITH POWER MANAGEMENT SYSTEM FOR HOUSEHOLD USERS TO MANAGE POWER BETWEEN DIFFERENT LOADS INCLUDING THEIR ELECTRIC VEHICLE

(71) Applicant: DCBEL INC., Montreal (CA)

(72) Inventors: Peter Ibrahim, Westmount (CA); Hani Vahedi, Brossard (CA); Jean-Hugues Deschênes, Montréal (CA); Marc-André Forget, Saint Lazare (CA)

( * ) Notice: Subject to any disclaimer, the term of this patent is extended or adjusted under 35 U.S.C. 154(b) by 81 days.

(21) Appl. No.: 17/439,776

(22) PCT Filed: Mar. 19, 2020

(86) PCT No.: PCT/CA2020/050380
§ 371 (c)(1),
(2) Date: Sep. 15, 2021

(87) PCT Pub. No.: WO2020/186363
PCT Pub. Date: Sep. 24, 2020

(65) Prior Publication Data
US 2022/0097547 A1 Mar. 31, 2022

Related U.S. Application Data

(60) Provisional application No. 62/820,659, filed on Mar. 19, 2019.

(51) Int. Cl.
*H02M 7/797* (2006.01)
*B60L 53/30* (2019.01)
(Continued)

(52) U.S. Cl.
CPC ............. *H02M 7/797* (2013.01); *B60L 53/20* (2019.02); *B60L 53/305* (2019.02); *B60L 53/51* (2019.02);
(Continued)

(58) Field of Classification Search
CPC .... H02M 7/797; H02M 7/4837; H02M 7/217; H02M 7/483; H02M 7/53; B60L 53/20;
(Continued)

(56) References Cited

U.S. PATENT DOCUMENTS 8,744,641 B2 6/2014 Ito
9,393,878 B1 7/2016 Failing
(Continued)

FOREIGN PATENT DOCUMENTS

| WO | 2011/134861 A1 | 11/2011 |
| WO | 2013/144947 A2 | 10/2013 |
| WO | 2019/071359 A1 | 4/2019 |

OTHER PUBLICATIONS

European application No. 20773929.3 the extended European search report dated Nov. 24, 2022.
(Continued)

*Primary Examiner* — Robert L Deberadinis

(57) ABSTRACT

An apparatus and method for managing power output of a converter has been provided by present disclosure having an electrical entry power sensor for measuring power drawn by an electrical entry of a household, a power drawn increase prediction module, a power budget controller managing power allocation to restrict a current level output by the power converter so as to prevent power drawn by the electrical entry from exceeding a predefined limit should the greatest probable jump in power drawn occur, a user interface allowing a user to request changes to said current level output by the power converter to charge an electric vehicle, wherein the power budget controller makes suggestions to said user to adjust said power drawn and has the user confirm said changes in order to reallocate said allocation according to said user's adjustments.

22 Claims, 13 Drawing Sheets

(51) Int. Cl.
| | |
|---|---|
| *H02J 3/38* | (2006.01) |
| *B60L 53/20* | (2019.01) |
| *B60L 53/51* | (2019.01) |
| *B60L 53/53* | (2019.01) |
| *B60L 53/62* | (2019.01) |
| *B60L 53/52* | (2019.01) |
| *H02M 7/217* | (2006.01) |
| *H02M 7/53* | (2006.01) |
| *H02M 7/483* | (2007.01) |

(52) U.S. Cl.
CPC ............... *B60L 53/52* (2019.02); *B60L 53/53* (2019.02); *B60L 53/62* (2019.02); *H02J 3/381* (2013.01); *H02M 7/217* (2013.01); *H02M 7/483* (2013.01); *H02M 7/4837* (2021.05); *H02M 7/53* (2013.01); *B60L 2210/30* (2013.01); *B60L 2210/40* (2013.01); *H02J 2300/24* (2020.01); *H02J 2300/28* (2020.01)

(58) Field of Classification Search
CPC ........ B60L 53/51; B60L 53/53; B60L 53/305; B60L 53/52; B60L 2210/30; B60L 2210/40; B60L 53/30; H02J 2300/28; H02J 2300/24; H02J 3/381

See application file for complete search history.

(56) References Cited

U.S. PATENT DOCUMENTS

| | | |
|---|---|---|
| 2011/0133693 A1 | 6/2011 | Lowenthal et al. |
| 2011/0221393 A1 | 9/2011 | Billmaier |
| 2013/0141040 A1 | 6/2013 | DeBoer et al. |

OTHER PUBLICATIONS

Tariq et al., Design of a proportional resonant controller for packed U cell 5 level inverter for grid-connected applications. 2016 IEEE International Conference On Power Electronics, Drives and Energy Systems (PEDES), IEEE, Dec. 14, 2016, pp. 1-6.

International application No. PCT/CA2020/050380 International Search Report dated Jun. 29, 2020.

International application No. PCT/CA2020/050380 Search Strategy dated Jun. 29, 2020.

International application No. PCT/CA2020/050380 Written Opinion of the International Searching Authority dated Jun. 29, 2020.

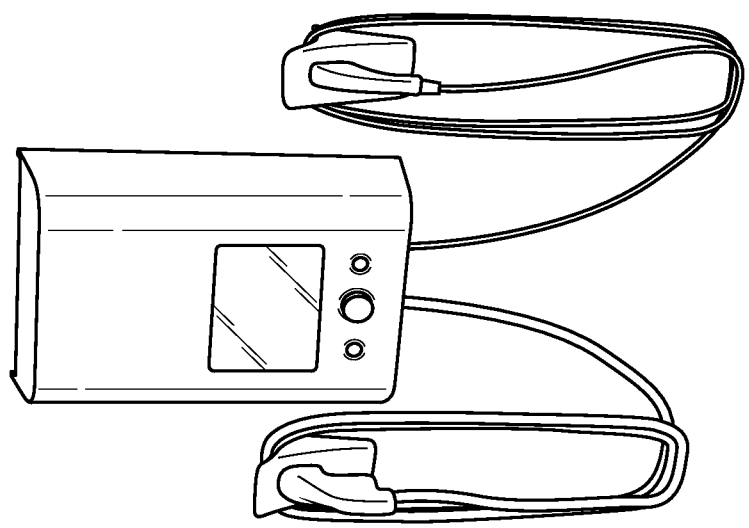

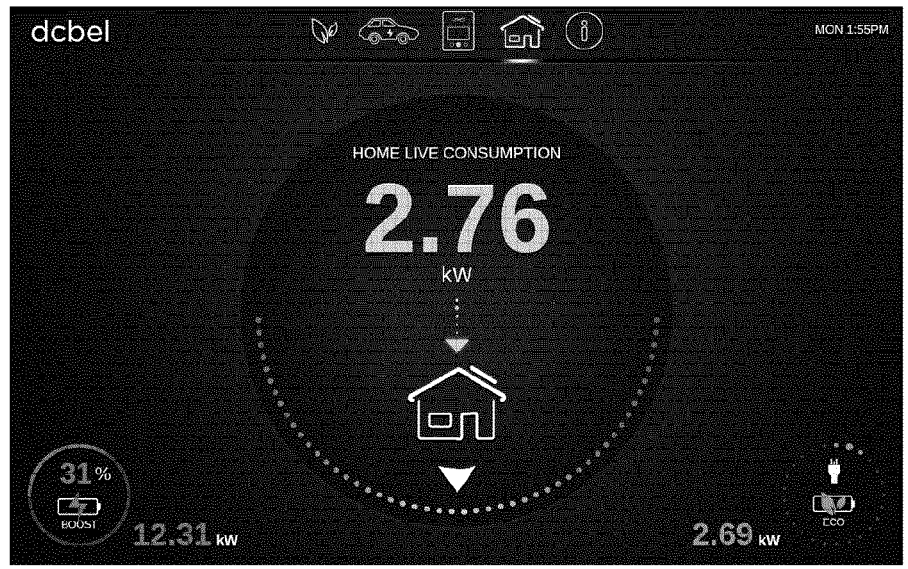
FIG. 13.A
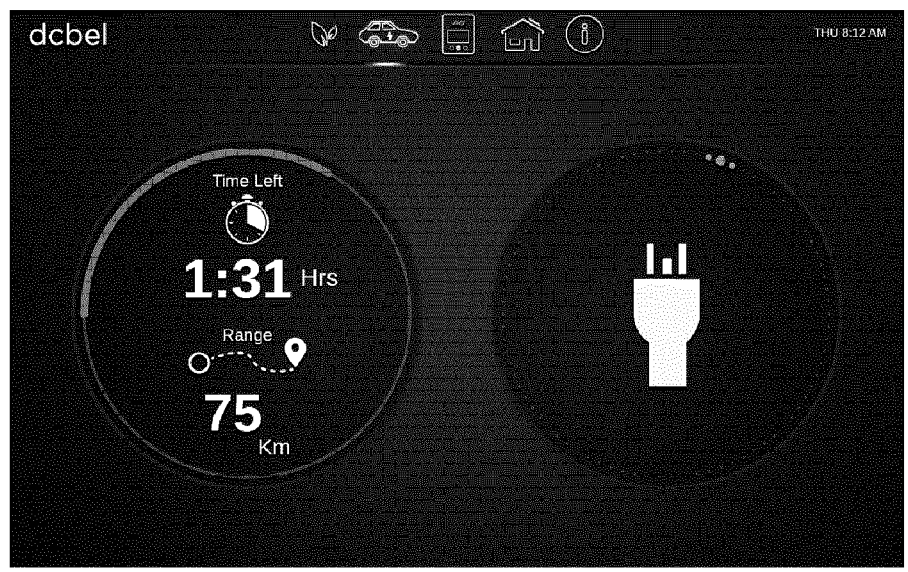
FIG. 13.B

CONVERTER WITH POWER MANAGEMENT SYSTEM FOR HOUSEHOLD USERS TO MANAGE POWER BETWEEN DIFFERENT LOADS INCLUDING THEIR ELECTRIC VEHICLE

The present application claims priority from U.S. provisional patent application No. 62/820,659 filed on Mar. 19, 2019, incorporated herein by reference.

FIELD OF THE INVENTION

The subject matter of the present application generally relates to the field of power management systems and more specifically to power management systems working with power converters such as EV chargers.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

As more and more people become interested in using renewable and environmentally friendly energy resources use of solar panels, electric cars become more popular. Such technologies in most cases need to be connected to and work with the power grid or the home electrical wiring. Furthermore, in regions with variable electricity tariffs for different times of the day, using an electric vehicle and/or solar energy may be more attractive for consumers if they could manage their consumption and production of energy to benefit from energy tariffs that are cheaper.

Solar panels or photovoltaic (hereinafter "PV") systems have specific advantages as an energy source causing no pollution and no emissions which, generally, generate DC power. In order to use this energy with household equipment's an inverter is normally used. Inverter is a type of electrical converter which converts the variable direct current (DC) output of a photovoltaic (PV) solar panel into a utility frequency alternating current (AC) that can be fed into a commercial electrical grid or used by a local, off-grid electrical network. There are several types of inverters used with solar panels such as stand-alone inverters, grid-tie inverters, battery backup inverters, and Intelligent hybrid inverters.

Since the electricity generation from solar panels fluctuates and may not be easily synchronized with a load's electricity consumption, when there is no solar electricity production, it is necessary to store energy for later use for example in a battery or other storage system to manage energy storage and consumption with an intelligent hybrid (smart grid) inverter.

Furthermore, electric cars ("EV"s), are becoming more and more popular. The new "level 3" charging systems, such as the charger disclosed by the applicant in the international PCT patent application having serial number PCT/CA2018/051291 published on Apr. 18, 2019 as WO2019/071359, are capable of providing in addition to AC power, DC power for home charging units. It must be mentioned that despite producing DC power, PV panel outputs cannot be directly fed to an EV vehicle to charge its battery.

With level 2 power consumption, the probability that vehicle's charging will cause the residential electrical entry or main circuit panel to draw more than its allowed power budget (and thus cause the main breaker to trip with the result that the panel is disconnected from the distribution transformer) is quite low. However, when a load greater than 7 kW is added to most domestic electrical panels, and for a duration of a number of hours, the risk increases that the total power budget of the domestic electric panel will be exceeded. Likewise, using a number of AC units or other high usage electrical appliances may introduce high load to the household's electrical budget.

Therefore, there exist a need for an energy management system which allows users to manage their energy consumption, including charging their electric vehicles, based on their priorities without overloading their home's electrical network and going over the budget define for the household.

On the other hand, despite the fact that battery of the EVs and solar panels are good sources of energy, it is currently difficult to use them to reduce the power load and/or benefit from lower possible energy tariffs.

Therefore, there also exist a need for a power management system capable of managing power between different loads and sources to minimize household energy expenditure and/or help the power grid as required.

SUMMARY

This patent application provides complementary improvements that may be applied separately or in combination.

One improvement relates to a power converter such as a bidirectional EV battery charger that provides suggestions to a user to adjust a power level provided by the charger to one or more EVs and/or other loads to avoid exceeding the nominal budget of the electrical entry if the greatest probable jump in consumption happens. Therefore, according to this, a time-based prediction of non-charging load power consumption, the greatest probable jump, may be based on modeling and/or historical monitoring of non-charging load power consumption.

In one broad aspect, the present disclosure provides a power conversion apparatus comprising an AC port, at least one DC port, a power converter, an electrical entry power sensor for measuring power drawn by an electrical entry of a household, a power drawn increase prediction module having an input for receiving a value of the power drawn and an output providing a value of a greatest probable jump in power drawn at the electrical entry, a power budget controller managing power allocation to restrict the current level output by the power converter so as to prevent power drawn by the electrical entry from exceeding a predefined limit should the greatest probable jump in power drawn occur, a user interface allowing a user to request changes to the current level output by the power converter. The power budget controller makes suggestions to the user to adjust the power drawn and has the user confirms the changes in order to reallocate the allocation according to the user's adjustments.

The entry of a household herein may refer to any electrical power feed connected to one or more power loads and or sources. For example, it would englobe a local network having a local generator, battery or any other source connected to some power loads such as the converter when working as a charger.

In some embodiments, the conversion apparatus further includes an optional sheddable load switch to reduce the user and wherein the suggestions include opening the sheddable load switch to reduce the power drawn by the household to achieve requested changes to the current level output.

In some embodiments, the suggestions made by the power budget controller may include reducing a charging intensity of another electric vehicle to achieve requested changes to the current level output.

In one embodiment, the suggestions made by the power budget controller include reducing a household load by switching certain electric consuming apparatus to achieve requested changes to the current level output.

In some embodiments, the suggestions made by the power budget controller include using a battery to achieve requested changes to the current level output. In one embodiment the battery may be the battery of another electrical vehicle.

In some embodiments, the greatest probable increase may be determined based on long-term observation data regarding consumption patterns.

In some embodiments, the power predictor may predict a more aggressive amount for the greatest probable increase until it gathers enough data on consumption patterns available.

In some embodiments, the power conversion apparatus may further include a display showing EV charge rate, mains power drawn and power limit.

In some embodiments, the power conversion apparatus may further include showing the value of the greatest probable jump in power drawn at the electrical entry.

In some embodiments, the power conversion apparatus may further include further comprising showing power received from a local generation source, e.g. solar, wind, micro-hydro or internal combustion engine generator.

In some embodiments, the power conversion apparatus may further include inverter and rectifier in the power converter and user input option to draw DC power from one EV to fast charge another EV.

In one embodiment, the suggestion made by the power budget controller is for a user to turn off a household load, and the user interface receives input to confirm switching off and power budget controller confirms the switching off through rapid reduction in the power drawn as measured by the electrical entry power sensor prior to increasing a charging rate of the EV.

In some embodiments, the user interface of the power conversion user interface includes a display on a wall-mounted unit associated with apparatus.

In some embodiments, user interface comprises a web browser or app interface in network or wireless communication with the power budget controller.

In some embodiments, the power converter supply of the power conversion apparatus may include at least one conversion module. The conversion module comprises at least one high-voltage capacitor for storing power at a high voltage and a circuit. The circuit itself comprises at least one inductor connected in series with the AC port, a low-voltage capacitor, two diodes or high-voltage switches connected between a first AC input terminal and opposed ends of the high-voltage capacitor; and two intermediate low-voltage switches connected between the opposed end of the high-voltage capacitor and opposed ends of the low-voltage capacitor, and two terminal low-voltage switches connected between the opposed ends of the low-voltage capacitor and a second AC terminal wherein a DC load can be connected to the opposed ends of the high-voltage capacitor; and a controller having at least one sensor for sensing current and/or voltage in the circuit and connected to a gate input of the two intermediate low-voltage switches and the two terminal low-voltage power switches.

In some embodiments the controller of the conversion module may be operative for causing the circuit to operate in a boost mode wherein a voltage of the high-voltage capacitor is higher than a peak voltage of the AC input, and the two intermediate low-voltage power switches and the two terminal low-voltage power switches are switched with redundant switching states in response to a measurement of a voltage present at the low-voltage capacitor so as to maintain the low-voltage capacitor at a predetermined fraction of a desired voltage for the high-voltage capacitor and to thus maintain the high-voltage capacitor at a desired high voltage, with the rectifier circuit supplying the DC load and absorbing power as a five-level active rectifier with low harmonics on the AC input.

In one embodiment the conversion apparatus comprises a chassis housing a plurality of conversion modules sockets or connectors each of the modules comprising the circuit, the modules working in parallel to provide DC power to the load.

In some embodiments, the circuit may be a bidirectional rectifier/inverter circuit comprising an inductor connected in series with an AC port, a low-voltage capacitor, two high-voltage power switches connected between a first AC terminal and opposed ends of the high-voltage capacitor, two intermediate low-voltage power switches connected between the opposed end of the high-voltage capacitor and opposed ends of the low-voltage capacitor, and two terminal low-voltage power switches connected between the opposed ends of the low-voltage capacitor and a second AC terminal;, wherein a DC port can be connected to the opposed ends of the high-voltage capacitor; the controller is a first controller for a rectifier mode having at least one sensor for sensing current and/or voltage in the bidirectional rectifier/inverter and connected to a gate input of the two high-voltage power switches, the two intermediate low-voltage power switches and the two terminal low-voltage power switches for causing the rectifier circuit to operate in a boost mode wherein a voltage of the high-voltage capacitor is higher than a peak voltage of the AC input, and the two high-voltage power switches are controlled to switch on and off at a frequency of the AC input, and the two intermediate low-voltage power switches and the two terminal low-voltage power switches are switched with redundant switching states in response to a measurement of a voltage present at the low-voltage capacitor so as to maintain the low-voltage capacitor at a predetermined fraction of a desired voltage for the high-voltage capacitor and to thus maintain the high-voltage capacitor at a desired high voltage, with the rectifier circuit supplying the DC load and absorbing power as a five-level active rectifier with low harmonics on the AC input; and the power converter further comprises a second controller for an inverter mode connected to the two high-voltage power switches, the two intermediate low-voltage power switches and the two terminal low-voltage power switches and configured to generate and apply to the two high-voltage power switches, the two intermediate low-voltage power switches and the two terminal low-voltage power switches signal waveforms comprising a first control signal for causing the low-voltage capacitor to be series connected with the DC port and the AC port and charged to a predetermined value proportional to a Voltage of the DC port, and a second control signal for causing the low-voltage capacitor to be disconnected from the DC port and series connected with the AC port, thereby causing the low-voltage capacitor to be discharged.

In some embodiments, the converter may include a processor, and a non-transitory computer-readable medium containing instructions that, when executed by said at least one processor, cause said at least one processor to perform measuring power drawn by an electrical entry of a household, determining a value of a greatest probable jump in power drawn using the measured power drawn, managing power allocation to restrict a current level output by said power converter so as to prevent power drawn by the electrical entry from exceeding a predefined limit should the greatest probable jump in power drawn occur, in response to receiving a request from a user to change to the current level output by the power converter, providing suggestions to the user to adjust said power drawn, receiving confirmation from the user regarding the adjustment, reallocating said power allocation according to said user's request.

In one broad aspect, the present disclosure provides a method for managing power consumption of a household having a power converter. The method comprises measuring power drawn by an electrical entry of a household, determining a value of a greatest probable jump in power drawn using the measured power drawn, managing power allocation to restrict a current level output by said power converter so as to prevent power drawn by the electrical entry from exceeding a predefined limit should the greatest probable jump in power drawn occur, in response to receiving a request from a user to change to the current level output by the power converter, providing suggestions to said user to adjust the power drawn, receiving confirmation from the user regarding the adjustment, reallocating said power allocation according to said user's request.

In some examples, the receiving confirmation from said user regarding the adjustment may comprise receiving user instructions regarding said suggestions, implementing said suggestions based on said user instructions.

In one embodiment, the providing suggestions to adjust the power drawn includes providing suggestions to adjust the power allocation for said converter. In other embodiments the suggestion may comprise providing suggestions to adjust power consumption of one or more other house loads.

In some examples of the present method the adjusting of the power allocation to reduce charger intensity of a first EV connected to said converter in order to increase charging intensity of a second EV connected to said converter.

In another broad aspect, the present disclosure provides a power conversion apparatus comprising an AC port, at least one DC port, a power converter, an electrical entry power sensor for measuring power drawn by an electrical entry of a household, and a processor with a memory having instructions that, when executed by the processor, predict power drawn increase by receiving a value of the power drawn and providing a value of a greatest probable jump in power drawn at the electrical entry; manage power allocation to restrict the current level output by the power converter so as to prevent power drawn by the electrical entry from exceeding a predefined limit should the greatest probable jump in power drawn occur; receive a user input to request changes to the current level output by the power converter; suggest to the user to adjust the power drawn and have the user confirm the changes in order to reallocate the allocation according to the user's adjustments.

In some examples of the method, in order to determine the value of the greatest probable jump in power drawn, the previously collected data on the total power consumption of the electrical entry may be also used. In some examples, this may include using different artificial intelligence or machine learning algorithms to predict the highest probable jump in the consumption.

In one example the method may further comprise adjusting said power allocation based on power received from a local power source.

BRIEF DESCRIPTION OF THE DRAWINGS

The present examples will be better understood with reference to the appended illustrations which are as follows:

FIG. 6 illustrates an example of the apparatus capable of charging two electric vehicles having an interface with a display in accordance to one embodiment of the present disclosure.

FIG. 13A shows a screenshot of the interface of the converter showing total energy consumption of the household.

FIG. 13B shows screenshot of the interface of the converter having information on the charging progress and the EV range.

DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

Throughout this application, the term "EV Level 2 apparatus" refers to a single-phase AC EV apparatus and the term "EV Level 3 apparatus" refers to a DC EV apparatus.

Figure 1A:
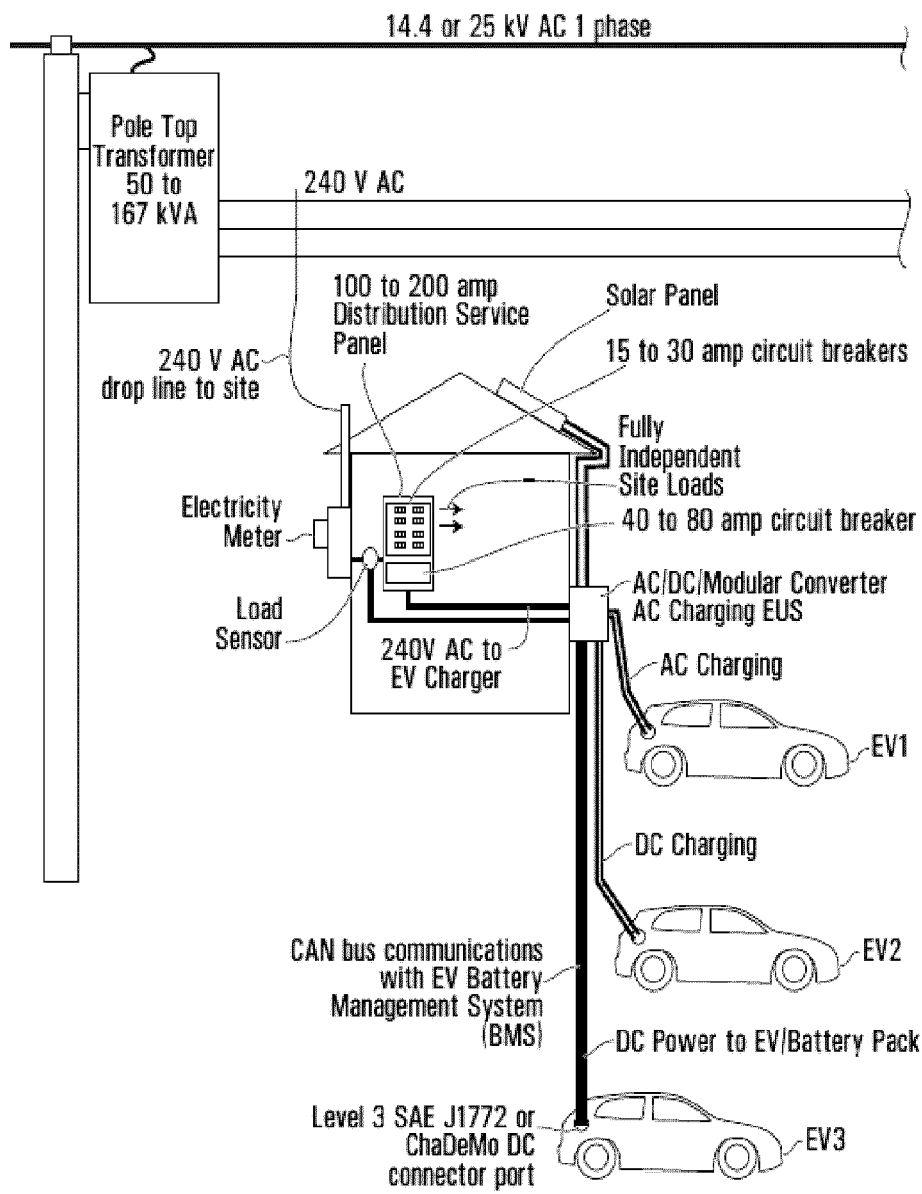
FIG. 1A is a schematic illustration of the physical installation of a home EV charging system including a pole-top transformer, residential electrical entry with a load sensor and a main circuit breaker panel, a 240 V AC power line between the panel and an apparatus, two cable connection extending between the apparatus and an electric vehicle (EV) with CAN bus connection between the EV and the apparatus and a solar panel connection.
Figure 1B:
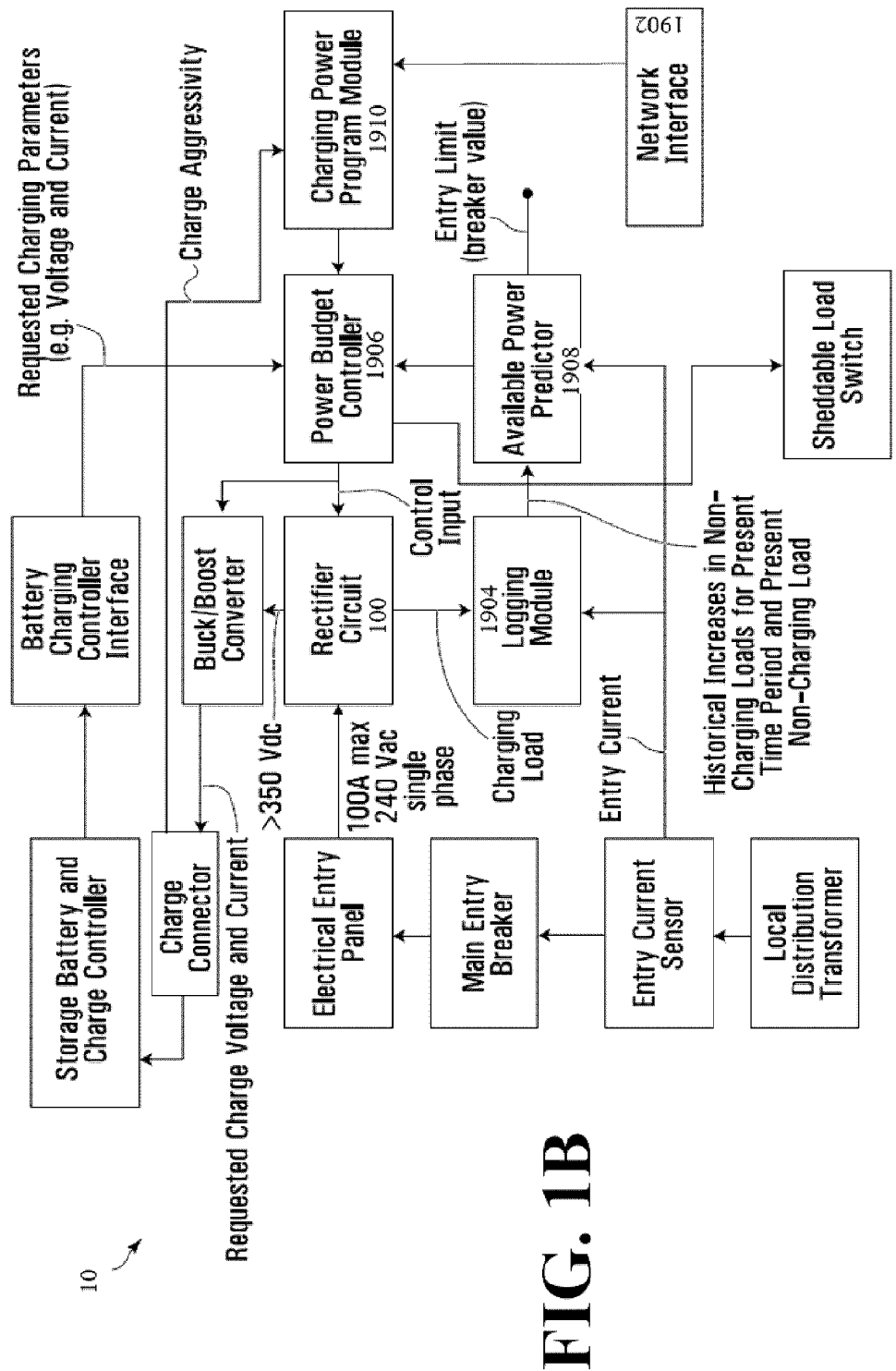
FIG. 1.B is a block diagram showing a power budget controller in accordance with one embodiment of the present disclosure.

FIG. 1.A illustrates the physical context of an embodiment in which split single phase main power is delivered from a utility pole top transformer, as is the most common type of electrical power delivery in North America. The transformer receives typically 14.4 kV or 25 kV single-phase power from a distribution line and the transformer can handle approximately 50 kVA to 167 kVA of power delivered as split phase 240 VAC to a small number of homes or electrical entries. Each electrical entry is typically configured to handle between 100 A to 200 A of power at 240 VAC, namely about 24 kVA to 48 kVA (the common assumption is that 1 kVA is equivalent to 1 kW). As shown, the conversion apparatus or device connects to the network via the AC connection and can connect to multiple vehicles and/or solar panel. This could be achieved thanks to bidirectional (rectifier/inverter) nature of the apparatus which provides it by the capability of receiving AC or DC power from one port and providing AC or DC from other ports.

The electrical entry typically comprises a usage meter, the main breaker having a rating corresponding to the total permitted load (e.g. 100 A or 200 A), and a panel having circuit breakers for each household circuit which may be supplied with 240 VAC power or 120 VAC power from the split phase 240 VAC input. While most circuit breakers have capacities of between 15 A to 30 A, some can be lower (namely 10 A) and some may be larger, such as 40 A, for large appliances. In some countries, electrical entries have a lower capacity, such as 40 A to 60 A, and in countries with 240 VAC in all household circuits, the power is not a split phase, but regular single phase 240 VAC (the voltage level used can vary from about 100 V to 250 V).

It will be appreciated that embodiments are not restricted to split single phase 240 VAC power systems and that the embodiments disclosed herein can be adapted to the power networks in use that are single or three phases of any existing AC voltage delivered to the electrical entry of homes or businesses.

As illustrated in FIG. 1.A, the conversion apparatus is connected to a circuit breaker of the main panel through a breaker having a larger current rating, such as 40 A to 80 A, although the apparatus disclosed can consume over 100 A if desired. The need for a circuit breaker specific to the apparatus is determined by electrical codes. The cable connecting the apparatus to the panel is rated for such high current. The connection to the electrical panel can be a direct fixed wiring, or a high-voltage socket can be installed and connected to the electrical panel such that the apparatus connects to the panel using a cable and plug, for example, those that are similar to those used for appliances like ovens or clothes dryers. The apparatus is shown to be connected to a single load sensor that senses the load drawn by the whole panel including the apparatus. The apparatus cable can be a conventional apparatus cable and plug, as is known in the art.

In some embodiments, the converter may be a modular multi-level circuit benefiting from modular converter circuits uni- or bi-directional. In one embodiment, the converter circuit or modules may be multilevel converter topology including three, five or seven level topologies. The details of a 5-level Packed U-Cell (PUC 5) which may be used with the different embodiments of the present disclosure has been disclosed by the applicant in the international PCT patent application having serial number PCT/CA2018/051291 with the publication number WO/2019/071359.

As mentioned, the converter may feature the 5-level Packed U-Cell topology working in a rectifier mode providing an active rectifier with power factor correction. The apparatus has several noteworthy advantages over other types of converters and features a boost mode operation which allows supra-AC peak output while reducing or eliminating input side current harmonics.

Figure 2B:
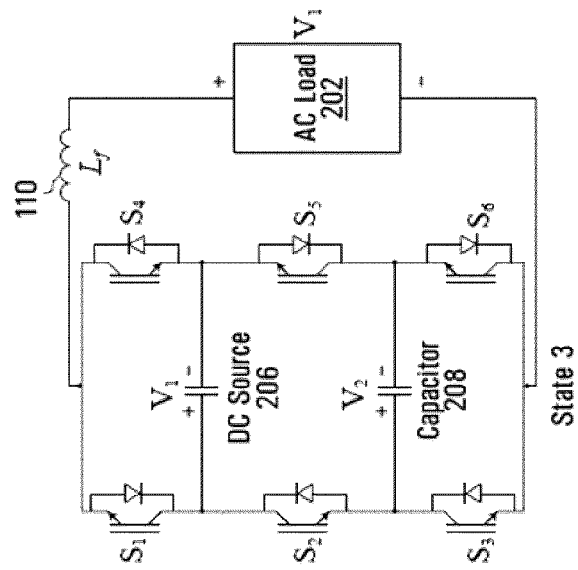
FIG. 2B shows a circuit diagram of a battery apparatus converter with a 5-level topology circuit working in an inverter mode, in accordance with one embodiment of the present disclosure.
Figure 2A:
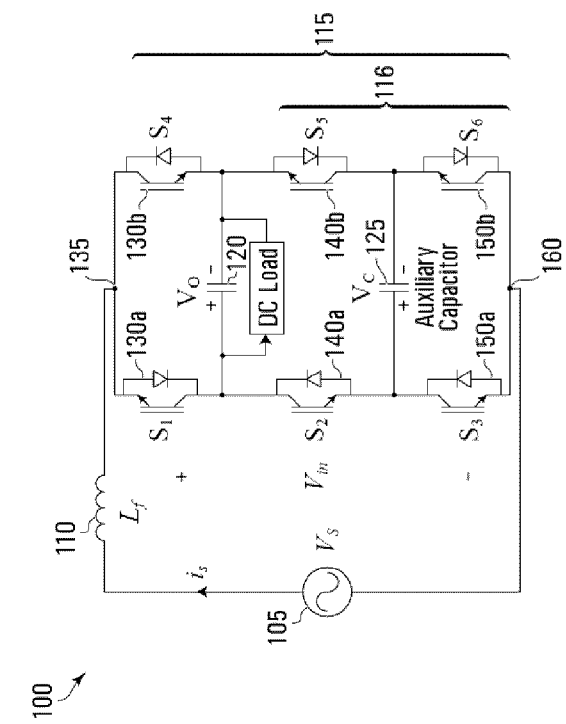
FIG. 2A shows a circuit diagram of a conversion circuit with a 5-level topology circuit working in a rectifier mode, according to a particular example of implementation.

As shown in FIG. 2A, the conversion circuit 100 working in the rectifier mode comprises an AC input 105, an inductive filter 110 connected in series with the AC input 105, and a 5-level topology circuit 115.

The inductive filter 110 in this non-limiting example is a 2.5 mH inductor. For a typical 1 to 3 kW range of power to be delivered (during all charging states of full power to under-power), a 1 mH line inductor provided good results which complied with existing standards. For higher power ranges, the inductance may be reduced; for example, for high wattage (e.g. greater than 2 kW, and preferably greater than 3 kW, and more preferably approximately 5 kW) power rating, the inductive filter 110 may instead use a 500 μH inductor. Conveniently the present design allows for a small geometry of the overall power conversion circuit 100, due in part to the small size of the inductive filter 110. The inductive filter 110 can vary according to design as chosen based on the application, power rating, utility voltage harmonics, switching frequency, etc. Although the simplest such filter is a single inductor, in an alternative embodiment the inductive filter 110 may include a combination of inductor(s) and capacitor(s), e.g., an (e.g., 2 mH) inductor connected to a capacitor (e.g., 30 μF), itself connected to ground. The choice of the filter has an impact on the overall size of the design and losses, with a bigger filter increasing the size of the overall design and generally incurring more losses.

The 5-level circuit comprises a high-voltage capacitor 120, at least one low-voltage capacitor 125, two high-voltage power switches 130a, 130b connected between a first terminal 135 and respective opposed ends 145a, 145b of the high-voltage capacitor 120, two intermediate low-voltage power switches 140a, 140b, each connected between respective ones of the two opposed ends 145a, 145b of the high-voltage capacitor 120 and respective opposed ends 155a, 155b of the low-voltage capacitor 125, and two terminal low-voltage power switches 150a, 150b each connected between a second input terminal 160 and respective ones of the opposed ends 155a, 155b of the low-voltage capacitor 125.

Referring to FIG. 2B, there is illustrated a topology 100 for the 5-level power converter working in the inverter mode, in accordance with one embodiment. An AC load 202 is connected across the first terminal 135 and the second terminal 160, which correspond to the only nodes in the circuit where only Switching elements are connected. The voltage produced between the first terminal 135 and the second terminal 160 is the inverters output voltage (V), which is illustratively a five-level Pulse Width Modulation (PWM) waveform.

The details of how the PUC 5 circuit functions in the rectifier and inverter switching as well as details on the switching states of the PUC 5 has been disclosed by the applicant in the international PCT patent application having serial number PCT/CA2018/051291 with the publication number WO/2019/071359.

In some embodiments the present disclosure provides a power management system for allowing implementation of a user's request. In FIG. 1.B, illustrates a block diagram showing a power budget controller working with a charger.

A logging module 1904 stores in a memory at least one parameter derived from the current drawn as measured by a sensor 1102, less any power drawn by the rectifier circuit over time for various sub-periods within each day. This parameter can be the greatest probable increase in non-charging loads for the present time period and the present non-charging load. Jumps in load can be derived from one or more appliances turning on. AC motors, such as heat pump and air conditioning compressor motors, typically draw at least twice their steady-state current when starting. As can be appreciated, the probability of an increase in power drawn can be within a desired likelihood, such as within 97% probability.

An available power predictor calculator 1108 receives the current drawn value, and the logging module parameter and provides a maximum charge load value to power budget controller 1906 as a function of a predetermined electrical entry maximum power load. The maximum load value for the electrical entry can be set using a user interface.

The power budget controller 1906 receives the maximum charge load value and, from the battery management interface, the desired charge voltage value and desired charge current value and provides the control input to the rectifier circuit.

In one embodiment, the greatest probable increase is determined based on long-term observation data. Until such data is acquired, the available power predictor may behave more conservatively, and as the certainty increases about the prediction, the predictor calculator can be more aggressive.

In another embodiment, the variations in power consumption are analyzed to determine the number and sizes of the main household loads. A behavior pattern for these loads is then detected. Loads that are estimated to be on, can only be turned off, and so they do not contribute to a risk of increasing the total load. The probability that a load will turn on is based on the state of other loads, time of day and time of year. For example, if a water heater is off, there can be a higher likelihood that it will turn on at any given moment from 7 AM to 8 AM due to water usage than from 11 PM to 6 AM. In summer, electric heating loads are unlikely to turn on, while AC is more likely, and the opposite may hold true in winter. Based on behavior patterns and the current estimate of what loads are on, the available power predictor can predict the greatest probable immediate increase in power.

The power budget controller 1906 considers the risk of the greatest probable increase in power to determine what power is available to the charger for consumption, and the power budget controller causes the rectifier circuit and/or the DC-DC down converter to adjust DC power delivered to the EV when the requested power would be too great.

Furthermore, the power budget controller 1906 can consider battery degradation when setting the charging rate. This can involve referencing a predetermined maximum charge current or power value. As described below, a user-selected charge aggressivity level can also be referenced.

In one embodiment, when the available power predictor module 1108 forecast that an increase in power is probable that could risk exceeding the power budget (entry limit), an optional sheddable load switch 1922 can be used to prevent a significant load from drawing power that can result in exceeding the power budget. This can delay or shift the added load to avoid exceeding the power budget of the electric entry. The sheddable load switch can include a line voltage power switch connected between one or more electrical loads and the electrical panel, for example, a water heater, to prevent the load from drawing current from the electrical panel with the risk that such additional load could exceed the power budget. Preferably, the load switch includes a sensor, for example, a current sensor, to measure whether the load is currently drawing power. In this way, the power budget controller can detect if the load in question is drawing power. The sheddable load switch, when open, can be equipped with sensors to detect when the disconnected load is looking to draw power, and in this case, the power budget controller can then decide to reconnect the load after reducing DC charging power accordingly.

Some loads that draw high current include control electronics that draw a small load in a standby state, for example, less than about 100 watts. In this case, it is possible to include bypass low power AC to the sheddable load while the sheddable load switch is open. An example of a low-power AC bypass connection is an isolation transformer configured to provide about ten to several tens of watts of power for the electronics of the sheddable load. When the load switches on, the sheddable load switch module can detect the draw of power on the load side of the isolation transformer and then signal the power budget controller to decide whether to reduce DC charge power to allow the sheddable load to be reconnected to full AC power, or whether DC charging at the same rate should continue. When DC charging load demand is over and then permits, the sheddable load can be reconnected.

In some embodiments, after system sets up all the limitations to avoid going over the budget, a user may still submit a request for a change this setting. For example, the user may request to have the EV vehicle be charged faster than what was allowed by the system. In such scenarios, the system may use the power drawn increase prediction module 1108 and the data available in logging module to make suggestions to the user to reduce the household load and create possibility of charging the vehicle with a higher charging aggressivity.

In one example, the system may use different sensors for different loads or use a smart home system to recognize different loads and send the required suggestions accordingly.

In some embodiments, the user may need to implement the changes and confirm with the converter that the changes have been implemented before the system changes the converters power allowance budget in accordance with the user's request.

In embodiments and for some of the suggestions, the system may be able to implement the changes upon on receiving the confirmation from the user. For example, if two EVs are charging simultaneously and the user wants to increase the charging intensity of one of them, the converter may suggest reducing the charging intensity of the other EV and upon user's confirmation implement such change. In another example, the load may be a household appliance like a dryer working with a smart home system. Upon receiving the confirmation, the converter may communicate with the smart home system to turn off that specific load to increase the charging intensity.

In one example, the converter may communicate independently with certain electrical appliances or as explained before have a sheddable load switch to reduce the household load and cope with a user suggestion.

It would be appreciated by those skilled in the art that the modules may be instructions saved on one or more non-transitory computer-readable mediums and may be performed by one or more processors. This may include a computer device connected to the converter circuit or located in a remote location, such as in cloud technology, controlling the converter.

Figure 3:
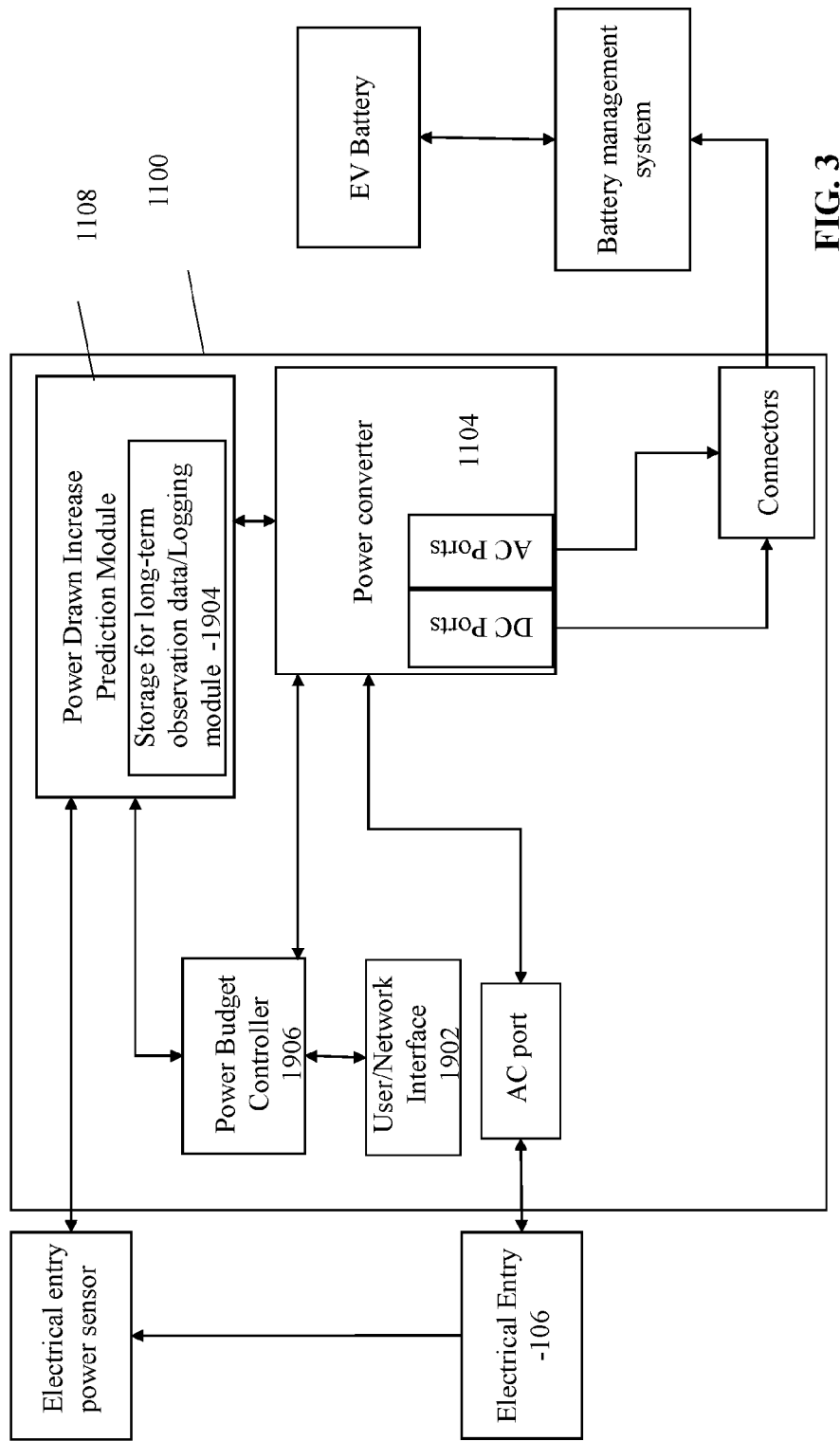
FIG. 3 illustrates a block diagram of the apparatus in accordance with one embodiment of the present disclosure wherein the apparatus allocates the power budget to charge one electric vehicle.

The embodiment in FIG. 3 may include a charging power program module that responds to user input to curb the charge rate when the user is not in a rush to charge the EV. While EV's can permit fast charging, and embodiments disclosed herein can allow for charging with powers of about 25 kVA, battery life can be reduced by repeated fast charging. Additionally, the charging power program module may be used to select a time program for charging, namely to delay and/or otherwise tailor power consumption in accordance with time-variable energy costs and/or the availability of power within the distribution network. The charging connector can, for example, provide a user interface for selecting a charge aggressivity level, namely a variable level of charge rate when the battery requests high rate charging. Alternatively, a network interface can be provided to allow a remote user interface to be used to set charging power program parameters.

In one embodiment, the user may request the energy management system of the converter to minimize the electrical expense of the household. Again, the system may make specific suggestions and ask for the user's confirmation to implement them.

For example, the energy management system may recognize that the electricity tariff is higher at certain times and in order to reduce the energy bill make suggestions to the user to reduce some loads during the energy tariff peak hours. In some other examples, the system may suggest using a local energy source like a backup battery or EV battery for household energy use during the peak hours. This way a backup battery or an EV battery is charged during the times that the energy tariff is low and may be used during peak hours to reduce the energy expense of the household or even help the network during the peak hours of energy consumption.

The network interface 1902 can be a conventional data interface, such as ethernet, Wi-Fi, etc., associated with a computer. The logging module 1904, power budget controller 1906, available power predictor 1908 and the charging power program module 1910 can be implemented in software stored in the memory of the computer and executed by a processor of the computer to perform the operations as described below.

FIG. 3 shows an embodiment of the apparatus 1100 having a sensor 1102 connected to the electrical entry. The power drawn prediction module 1108 receives the information regarding the energy consumption patterns and, in one embodiment, may store this information for predicting the maximum power drawn. The power budget module 1106 receives the prediction as well as the total load from sensor 1102 and the information from power converter 1104 and manages the power budget for charging an electric vehicle.

Figure 11:
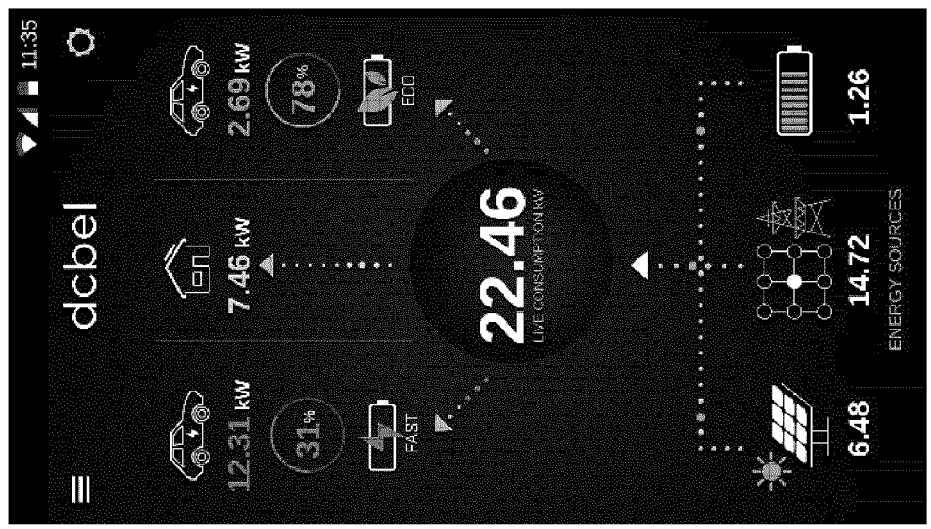
FIG. 11 shows a screenshot of the interface of the converter illustrating energy sources and distribution including charging modes for two different EVs in accordance to one embodiment.

When a user request fast charging of the vehicle, for example by touching on the interface screen shown in FIG. 11 at the "FAST/ECO" charging symbol, if enough power is not available, the system may provide suggestions as to how the EV charging budget can be increased. This may include disconnecting some sheddable load using the sheddable load switch 1922 or alternatively asking the user to switch off certain devices having specific load. The system may recognize this switching off using the sensors or may ask the user to confirm it.

In one embodiment, the apparatus can connect to electric devices and control them remotely as to reduce the load. This may be done by user confirmation or set up to be done completely automatically.

Figure 4:
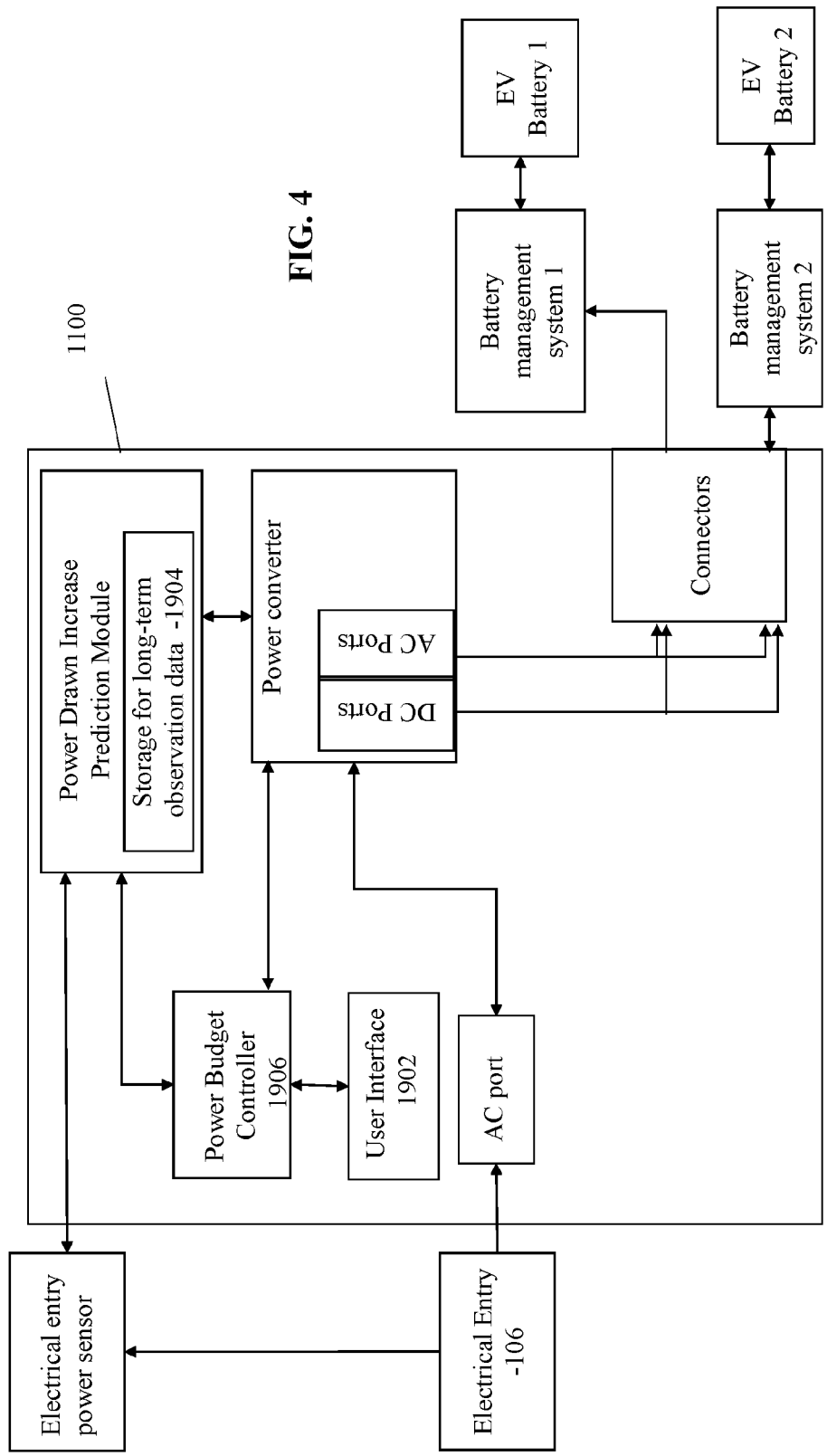
FIG. 4 illustrates a block diagram of the apparatus in accordance with one embodiment of the present disclosure wherein the apparatus allocates the power budget to distribute power between household and two electric vehicles.

FIG. 4 shows a scenario in which the apparatus 1100 manages charging of the two electric vehicles. In this scenario the power budget controller 1106 has to manage the charging budget of two vehicles. When a user requests fast or boost charging of a vehicle in addition to options mentioned above, the system may reduce the charging rate of the other EV or even use the other EV's battery to fast charge the battery of EV for which fast charge has been requested. An example of device 1100 for charging two vehicles has been shown in FIG. 6.

Figure 5:
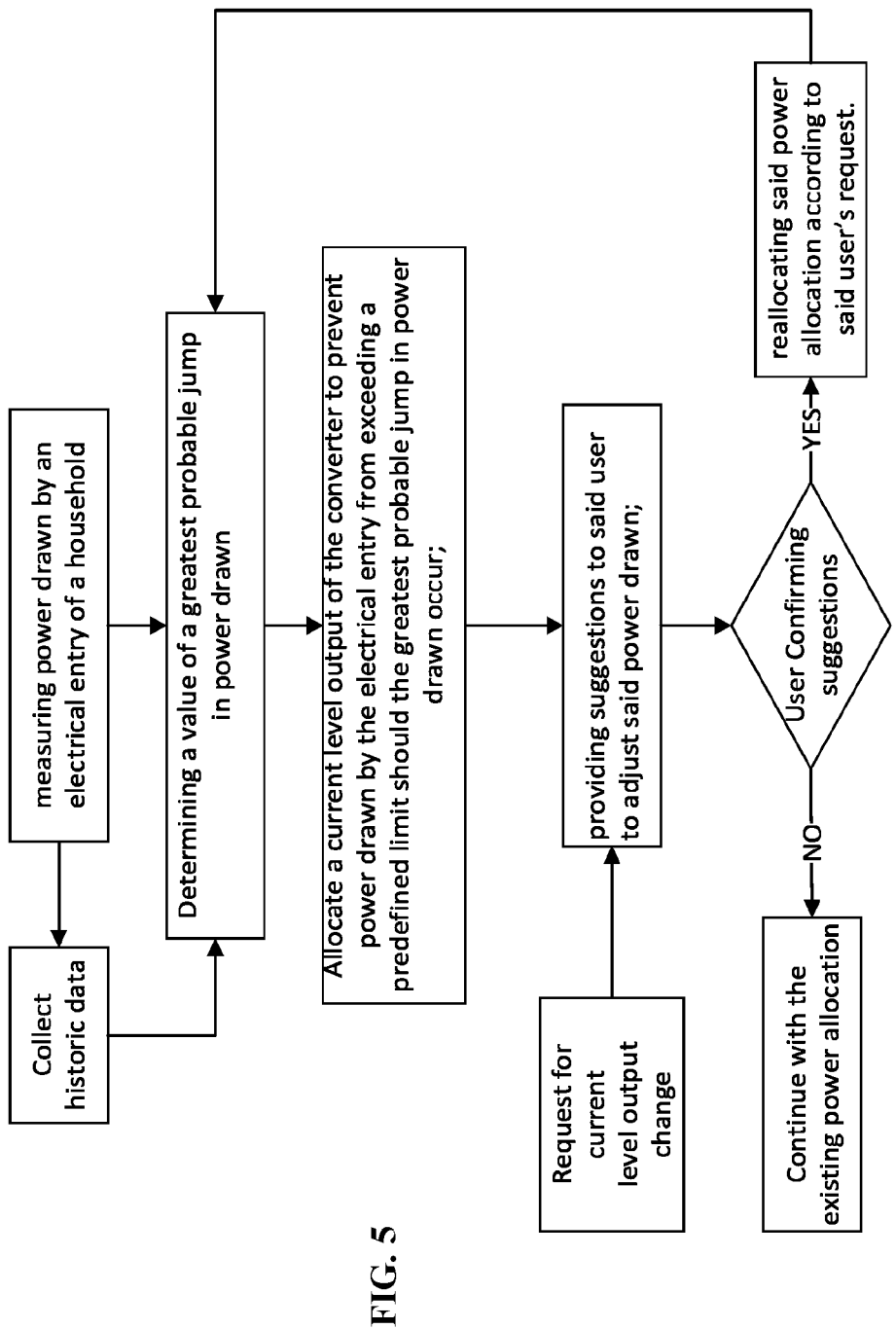
FIG. 5 shows a flowchart of the steps taken in accordance with one embodiment of the present disclosure to adjust the power allocation between multiple loads to comply with a user request.

Referring to FIG. 5 shows an example the steps taken by the present disclosure to manage the power allocation of the steps taken by the converter's management system to make sure that the power drawn from the electrical entry does not exceed the predetermined limit. At least one sensor may be used to measure power drawn by at the entry for example the household. This data may be collected in a historic data collection or logging module. This data may include a number of other sensors measuring power consumption at different sections of the household or even per each electrical appliance or device. In one example the data may be fetched from a smart home system having necessary sensors in place to provide the required data. In another example, the converter may work as the smart hub and manage different appliances and directly interact with them and measure their consumption and other required information such as time of use, frequency of use based on temperature and specific seasonal features, consumption patterns based on day of the week, month and season as well as the weather forecast. Furthermore, a user may add or remove specific events that may cause an increase or decrease in consumption into the logging module or historic data collector. Some specific events may include, times when house is empty or a specific event would happen or periods in which the EV(s) may need to be fully charged such as in the morning during work days.

This way the value of the greatest probable jump in the power drawn would be calculated. Using this data and the current power drawn the converter allocates the amount of power it may provide to different devices such as EV(s), backup battery or any other load. This amount may be adjusted by the amount of energy received from a source for example solar panels, a local power generator or a backup battery.

If a user request changes to this power allocation, the converter power manager may provide the user with different suggestions and may ask the user the confirm the suggestion. This may include asking the user to implement the changes and confirm their implementation or asking for permission to implement the changes. If in the other hand the user does not confirm the changes the converter may make different suggestions but would continue working in the same manner until a confirmation is received.

In some embodiments, the converter may ask the user for permission to implement the same suggestions in similar situations. In another embodiment, the user may use an interface to prioritize options and therefore, change the order of the suggestions and or set up the system to accept certain suggestions automatically.

In one embodiment, the system may learn from the accepted suggestions and modify the order of the changes based on the prior user confirmation patterns. In some examples, the system may use machine learning and AI algorithms known in the art to modify these suggestions.

FIGS. 7 to 16 show the interface and how the system can be managed and observed by a user using a mobile app, computer or any other end device even remotely.

Figure 7:
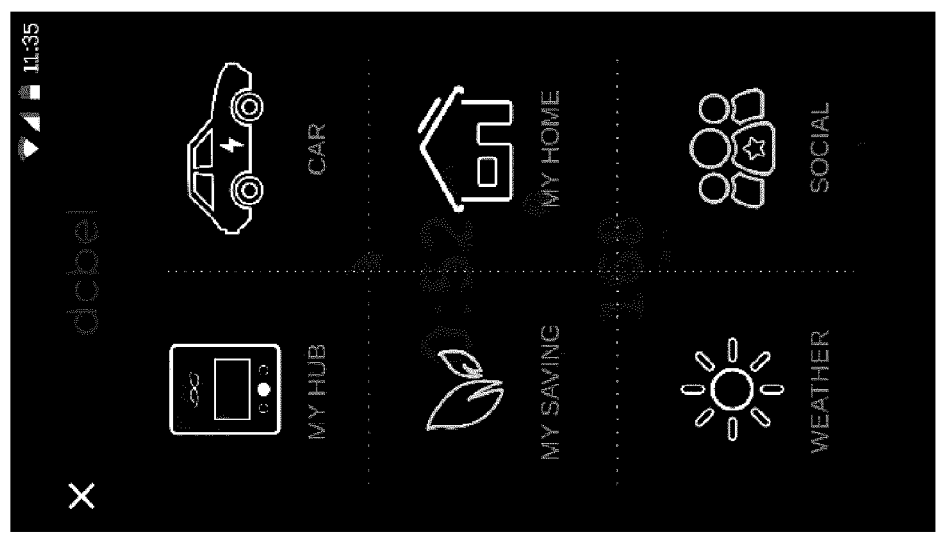
FIG. 7 shows a screenshot of the interface of the converter showing multiple options, main menu, of available on the interface in accordance with one embodiment.
Figure 10:
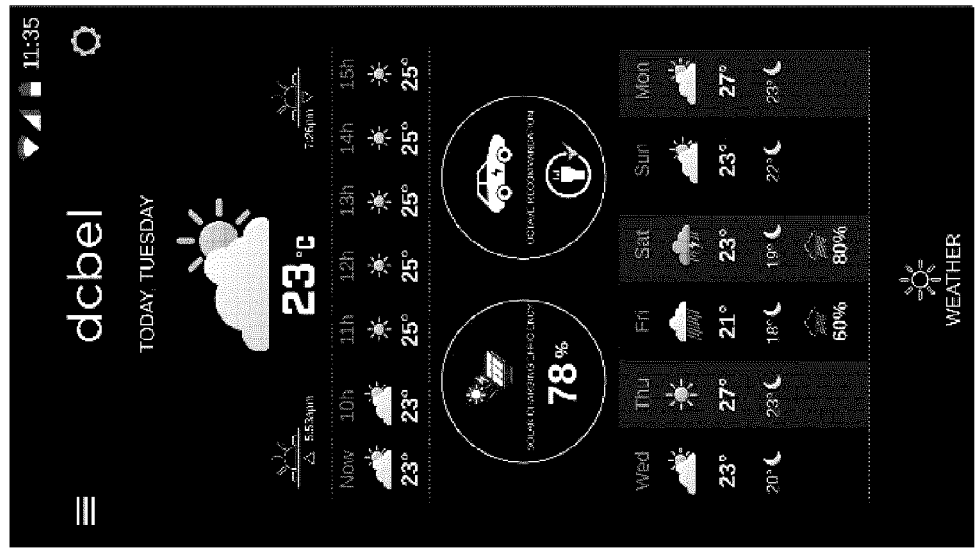
FIG. 10 shows a screenshot of the interface of the converter illustrating weather conditions, solar panels efficiency and EV charging status in accordance with one embodiment.

As shown in FIG. 7, system may provide information regarding solar panels, EV batteries or other batteries connected to the system (backup battery), the household consumption, etc. and allow a user manage them accordingly.

Figure 8:
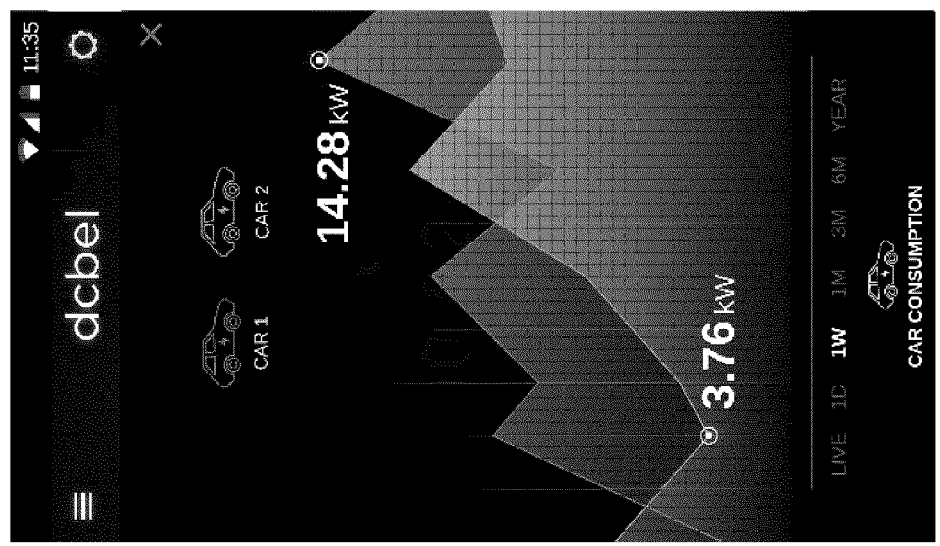
FIG. 8 shows a screen shot of the interface illustrating EV consumption patterns for 2 EV vehicles in accordance with one embodiment.

In FIG. 8, the system provides the user with information regarding the charging of one or more EVs, electricity consumption and other necessary information.

Figure 9:
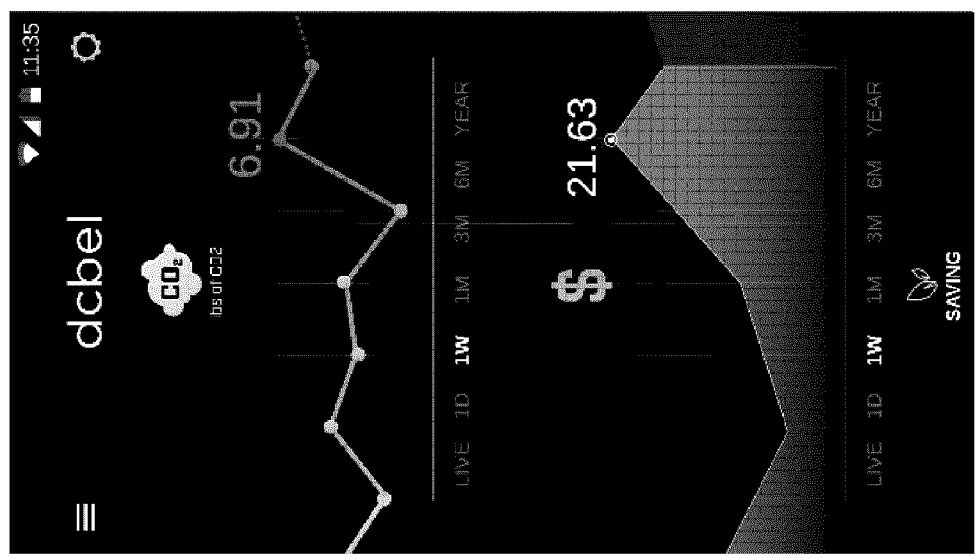
FIG. 9 shows a screenshot of the interface of the converter illustrating CO2 emission patterns and financial savings for EV users the converter, in accordance with one embodiment.

FIG. 9 shows the information provided to a user regarding the carbon emission of the energy consumed and the money saved by the user. As in FIG. 10, the interface may further provide weather forecast information and use them in managing power allowance. For example, a warmer day may indicate use of AC by the user or a cloudy day may indicate low energy production by the solar panels.

FIG. 11 shows the interface, here as a mobile app, with the allocation of energy received and consumed In some embodiments, the display in FIG. 11 may show one or more of the storage capacity of each EV, the percentage of charge of each EV, the charging schedule for each EV, e.g., ECO, FAST, or optionally different levels of FAST charging, whether DC power is being drawn from an EV to give more power budget for charging another EV, power contributions from sources other than the power grid, e.g., solar, storage battery, wind, etc. the total power budget, namely in the case of only grid power the main electric entry breaker value, the greatest probable jump in power drawn at the electrical entry from household loads, information about loads that have been shed to give more EV charging capacity, etc. Furthermore, upon request a change in for example charging intensity of an EV vehicle, a suggestion may be shown on the display which may be implemented after confirmation of the user or implemented by the user and confirmed on the screen.

Figure 12:
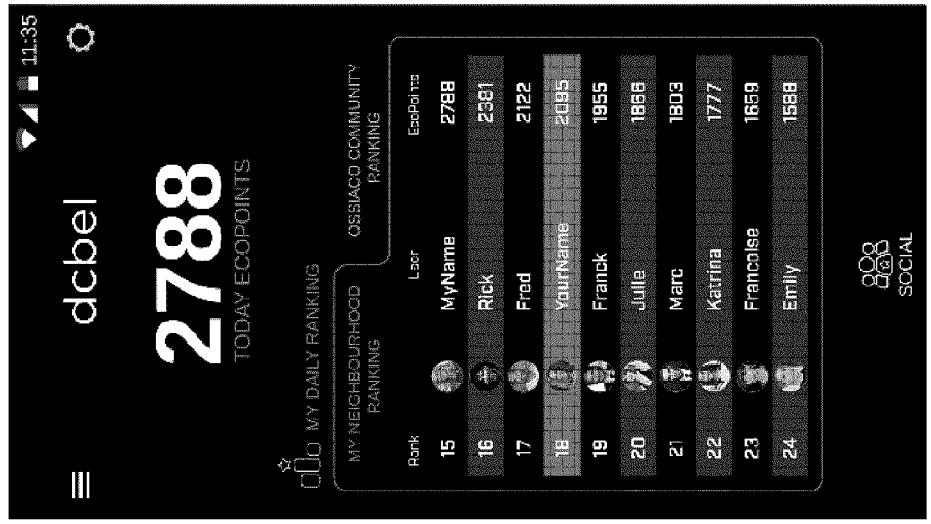
FIG. 12 shows a screenshot of the interface of the converter illustrating a social networking page for users with similar systems including Ecopoints for each user and their ranking.

Referring to FIG. 12 a screenshot of the interface of the converter illustrating a social networking page for users with similar systems including Ecopoints for each user and their ranking. As illustrated, the users in the neighborhood or community may have their own profile and may exchange data including their energy consumption patterns. This may include neighbors arranging their energy consumption to avoid any problem with the distribution network. Also, it may allow the members to use including buy or sell their energy among each other depending on their needs.

Figure 14:
FIG. 14 shows a screenshot of the interface of the converter illustrating Ecopoints and neighborhood ranking of the user in accordance with one embodiment.
Figure 15:
FIG. 15 shows a screenshot of the interface of the converter illustrating customer support options for the converter.
Figure 16:
FIG. 16 shows a screenshot of the interface of the converter illustrating a summary of solar panel information, EV charger's information, and climate in accordance with one embodiment.

FIG. 13A the interface of the converter showing total energy consumption of the household. FIG. 13B show screen shot of the interface of the converter having information on the charging progress and the EV range. FIG. 14 shows the interface of the converter illustrating Ecopoints and neighborhood ranking of the user in accordance with one embodiment. FIG. 15 shows a screenshot of the interface of the converter illustrating customer support options for the converter. FIG. 16 shows a screenshot of the interface of the converter illustrating a summary of solar panel information, EV charger's information, and climate in accordance with one embodiment.

In one embodiment, the apparatus may have a calibration mode in which it may learn how each electric device may affect the total household load. It may ask a user to turn the devices in the house on and off to measure and register its effect on total load and later make suggestions accordingly. It may also have sensors at different parts of the house to measure consumption and make suggestions accordingly.

As shown in FIG. 6, the apparatus 1100 may have a screen on it which enable to have the interface on the apparatus itself.

Although the above description has been provided with reference to a specific example, this was for the purpose of illustrating, not limiting, the invention.

What is claimed is:

1. A power conversion apparatus comprising:
   an AC port;
   at least one DC port;
   a power converter;
   an electrical entry power sensor for measuring power drawn by an electrical entry of a household;
   a power drawn increase prediction module having an input for receiving a value of the power drawn and an output providing a value of a greatest probable jump in power drawn at the electrical entry;
   a power budget controller managing power allocation to restrict a current level output by the power converter so as to prevent power drawn by the electrical entry from exceeding a predefined limit should the greatest probable jump in power drawn occur;
   a user interface allowing a user to request changes to said current level output by the power converter to charge an electric vehicle;
   wherein the power budget controller makes suggestions to said user to adjust said power drawn and has the user confirm said changes in order to reallocate said allocation according to said user's adjustments.

2. The apparatus in claim 1 said conversion apparatus further comprises an optional sheddable load switch to reduce the user and wherein said suggestions include opening said sheddable load switch to reduce the power drawn by the household to achieve requested changes to said current level output.

3. The apparatus in claim 1, wherein said suggestions include reducing a charging intensity of another electric vehicle to achieve requested changes to said current level output.

4. The apparatus in claim 1, wherein said suggestions includes reducing a household load by switching certain electric consuming apparatus to achieve requested changes to said current level output.

5. The apparatus in claim 1, wherein said suggestions includes using a battery to achieve requested changes to said current level output.

6. The power conversion unit in claim 1, wherein said battery is the battery of another electrical vehicle.

7. The apparatus in claim 1, wherein said greatest probable increase is determined based on long-term observation data regarding consumption patterns.

8. The apparatus in claim 1, wherein said power predictor may predict a more aggressive amount for said greatest probable increase until it gathers enough data on consumption patterns available.

9. The apparatus in claim 1 further comprising a display showing EV charge rate, mains power drawn and power limit.

10. The apparatus in claim 1 further comprising showing said value of a greatest probable jump in power drawn at the electrical entry.

11. The apparatus in claim 1 further comprising showing power received from a local generation source, e.g. solar, wind, micro-hydro or internal combustion engine generator.

12. The apparatus in claim 1 further comprising inverter and rectifier in said power converter and user input option to draw DC power from one EV to fast charge another EV.

13. The apparatus in claim 1, wherein suggestion is for a user to turn off a household load, and said user interface receives input to confirm switching off and power budget controller confirms the switching off through rapid reduction in said power drawn as measured by said electrical entry power sensor prior to increasing a charging rate of said EV.

14. The apparatus in claim 1, wherein said user interface comprises a display on a wall-mounted unit associated with apparatus.

15. The apparatus in claim 1, wherein said user interface comprises a web browser or app interface in network or wireless communication with said power budget controller.

16. A method for managing power consumption in an electrical entry using a power converter:

measuring power drawn at the electrical entry to determine a total power consumption of a network connected to the electrical entry;

determining a value of a greatest probable jump in power drawn using the total power consumption at the electrical entry;

managing a power allocation of the converter to restrict a power output by said power converter as to prevent power drawn by the electrical entry from exceeding a predefined limit should the greatest probable jump in power drawn occur;

in response to receiving a request from a user to apply changes to the power allocation, providing suggestions to said user to adjust said power drawn;

receiving confirmation from said user regarding the adjustment;

reallocating said power allocation based on the request accordingly.

17. The method of claim 16, wherein the receiving confirmation from said user regarding the adjustment comprises:

receiving user instructions regarding said suggestions; and implementing said suggestions based on said user instructions.

18. The method of claim 16, wherein the providing suggestions to adjust the power drawn comprises providing suggestions to adjust the power allocation of the converter.

19. The method of claim 16, wherein said providing suggestions to adjust the power drawn comprises providing suggestions to adjust power consumption of one or more loads connected to the electrical power entry.

20. The method as defined in claim 16, wherein the method further comprises:

adjusting said power allocation to reduce charge rate of a first EV connected to said converter in order to increase charge rate of a second EV connected to said converter.

21. The method as defined in claim 16, wherein the method further comprises adjusting said power allocation based on power received from a local power source.

22. The method of claim 16, wherein the determining the value of the greatest probable jump in power drawn using the total power consumption at the electrical entry further comprises using previously collected data on the total power consumption.

\* \* \* \* \*